W. L. FINNE.
CONDENSER COIL.
APPLICATION FILED MAR. 27, 1917.
1,244,722.
Patented Oct. 30, 1917.
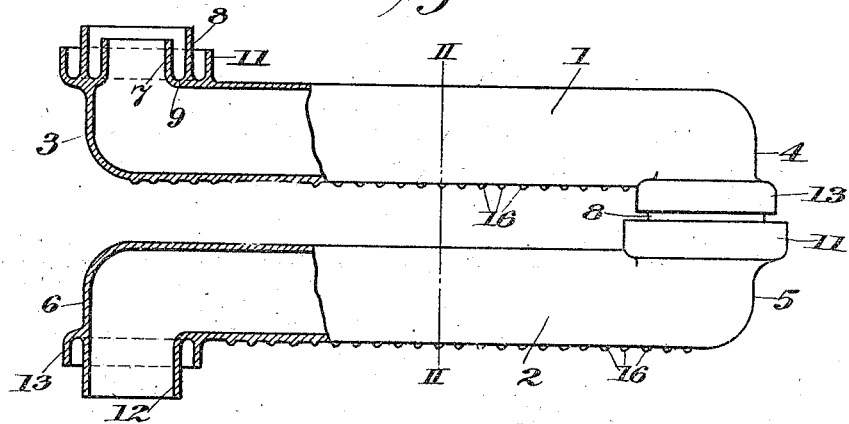
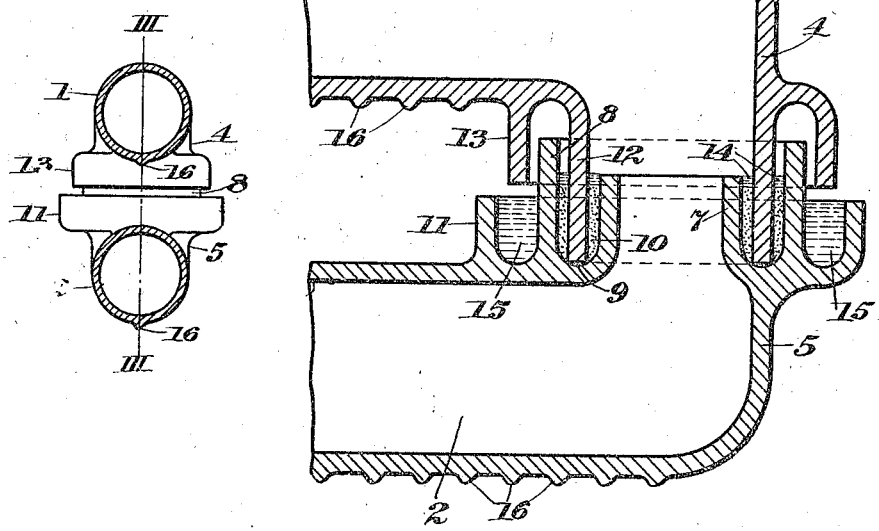
Inventor
William L. Finne
By Frederick V. Winters
Attorney

UNITED STATES PATENT OFFICE.

WILLIAM L. FINNE, OF ELIZABETH, NEW JERSEY.

CONDENSER-COIL.

1,244,722.  Specification of Letters Patent.  Patented Oct. 30, 1917.

Application filed March 27, 1917. Serial No. 157,606.

*To all whom it may concern:*

Be it known that I, WILLIAM L. FINNE, a citizen of the United States, residing at Elizabeth, in the county of Union and State of New Jersey, have invented certain new and useful Improvements in Condenser-Coils, of which the following is a full, clear, and exact specification.

This invention relates to condenser coils, and has for its object to provide an improved and simplified form of joint especially designed for the pipes of condenser coils.

In the operation of condensers, gas is passed through pipe coils, and as the gas condenses the liquid runs down the pipes on both the inside and outside surfaces thereof. It is important to provide a joint between the sections of the pipe coils which will prevent the gas from leaking out and the liquid which runs down the outside of the pipes from entering the coils. The present invention provides such a joint which is also composed of a minimum number of parts, all of which are formed integral with the pipes, so that it is unnecessary to employ any separate parts which are apt to work loose and become lost.

The invention will be first hereinafter described in connection with the accompanying drawings, which constitute part of this specification and then more specifically defined in the claims at the end of the description.

In the accompanying drawings, wherein similar reference characters are used to designate corresponding parts throughout the several views:

Figure 1 is a broken side view of two sections of a pipe coil for use in a condenser.

Fig. 2 is a section on the line II—II of Fig. 1, and

Fig. 3 is a section on the line III—III of Fig. 2, drawn to a larger scale.

A condenser coil may be composed of any suitable number of similarly formed pipe sections which are alternately reversed end for end in assembling them, as the pipe sections 1 and 2 illustrated in the drawing. The upper and lower ends 3 and 4, respectively, of the pipe section 1 are formed exactly like the upper and lower ends 5 and 6, respectively, of the pipe section 2. The upper end of each pipe section has formed integral therewith three concentric upwardly extending flanges 7, 8 and 11, and the lower end of each pipe section has formed integral therewith two downwardly extending integral flanges 12 and 13. When the pipe sections are assembled, as best shown in Fig. 3, the inner flange 12 on the lower end of one pipe section fits into the space or groove 9 between the flanges 7 and 8 on the upper end of the next pipe section. Suitable packing 10 is placed in said groove 9 around the edge of the flange 12, but said packing terminates some distance below the edge of the flange 7 which is the innermost one of the flanges on the upper end of the pipe section.

The flange 8 extends above the flange 7 to prevent the liquid which flows into the groove 9 from the interior of the coil from escaping at the joint. The liquid which does flow into the groove 9 from the interior of the coil collects above the packing 10 and forms a liquid seal 14.

The flange 13 overhangs the flange 8 and serves as a water shed to prevent the liquid which flows down the outside of the coil from entering at the joint. This liquid is delivered by the flange 13 into a groove 15 between the flanges 8 and 11 on the upper end of each pipe section, and when said groove 15 becomes full the liquid escapes over the flange 11 and is evenly distributed around the pipe.

To prevent the liquid from collecting at one point on each pipe section, the bottoms of said sections are formed with knobs 16 arranged at intervals throughout their length. These knobs or ribs 16 cause the liquid to drop from each of them, thereby dividing the falling liquid into a shower instead of a single stream.

Having thus described my invention, what I claim as new and desire to secure by Letters Patent of the United States is:

1. A condenser coil, of the character described, comprising a plurality of superimposed pipes each having a pair of concentric flanges at its upper and lower ends, the inner flange on the lower end of each pipe resting between the flanges on the upper end of the next pipe below, and one flange on the the upper end of each pipe extending between the flanges on the lower end of the next pipe above, whereby a liquid seal is formed around the inner flange on the lower end of each pipe in the space bounded by the flanges between which it rests by the condensation of the gas passing through the coil, the inner flange on the upper end of each pipe terminating below the upper edge of the other flange thereon, which extends between the flanges on the lower end of the next pipe above, for preventing the escape of the condensation to the outside of the coil, and the outer flange on the lower end of each pipe preventing the cooling water on the outside of the coil from entering said coil by overhanging the higher flange on the upper end of the next pipe below.

2. A condenser coil, of the character described, comprising a plurality of superimposed pipes each having a pair of concentric flanges at its upper and lower ends, the inner flange on the lower end of each pipe resting between the flanges on the upper end of the next pipe below, and one flange on the upper end of each pipe extending between the flanges on the lower end of the next pipe above, whereby a liquid seal is formed around the inner flange on the lower end of each pipe in the space bounded by the flanges between which it rests by the condensation of the gas passing through the coil, the inner flange on the upper end of each pipe terminating below the upper edge of the other flange thereon, which extends between the flanges on the lower end of the next pipe above, for preventing the escape of the condensation to the outside of the coil, and the outer flange on the lower end of each pipe preventing the cooling water on the outside of the coil from entering said coil by overhanging the higher flange on the upper end of the next pipe below, there being a third concentric flange on the upper end of each pipe surrounding and terminating below the outer one of the other two flanges thereon, said third flange extending beyond the outer flange on the lower end of the next pipe above and serving to evenly distribute the cooling water around the coil.

In testimony whereof I have signed my name to this specification.

WILLIAM L. FINNE.